United States Patent [19]

Barber et al.

[11] Patent Number: 5,390,297
[45] Date of Patent: Feb. 14, 1995

[54] SYSTEM FOR CONTROLLING THE NUMBER OF CONCURRENT COPIES OF A PROGRAM IN A NETWORK BASED ON THE NUMBER OF AVAILABLE LICENSES

[75] Inventors: Jon H. Barber, Santa Barbara, Calif.; Ronald A. Woodward, Boulder, Colo.; Richard M. Burkley, Boulder, Colo.; Erwin L. Rehme, Longmont, Colo.; Matthew W. Jackson, Boulder, Colo.; Douglas M. Young, Boulder, Colo.

[73] Assignee: Auto-trol Technology Corporation, Denver, Colo.

[21] Appl. No.: 118,909

[22] Filed: Nov. 10, 1987

[51] Int. Cl.$^6$ .............................................. G06F 13/00
[52] U.S. Cl. .................................. 395/200; 395/700; 364/280; 364/286.5; 364/286.6; 364/DIG. 1; 380/4; 380/25
[58] Field of Search ... 364/200 MS File, 900 MS File; 380/3, 4, 25; 340/825.31, 825.34

[56] References Cited

U.S. PATENT DOCUMENTS

| | | | |
|---|---|---|---|
| 4,446,519 | 5/1984 | Thomas | 364/300 |
| 4,558,413 | 12/1985 | Schmidt et al. | 364/300 |
| 4,658,093 | 4/1987 | Hellman | 380/25 |
| 4,683,968 | 8/1987 | Appelbaum | 380/4 |
| 4,694,396 | 9/1987 | Weisshaar et al. | 364/200 |
| 4,754,395 | 6/1988 | Weisshaar et al. | 364/200 |
| 4,780,821 | 10/1988 | Crossley | 364/200 |
| 4,791,565 | 12/1988 | Dunham et al. | 364/200 |
| 4,796,220 | 1/1989 | Wolfe | 364/900 |
| 4,800,488 | 1/1989 | Agrawal et al. | 364/200 |
| 4,866,769 | 9/1989 | Karp | 380/4 |
| 4,924,378 | 5/1980 | Hershey et al. | 364/200 |

OTHER PUBLICATIONS

Auto–trol Software Protection Installation Guides, (a) No. 127-14088-001, Revision A, Apr. 4, 1986 (Apollo Version), cover page, notice page and pages one and two; and (b) No. 127-14462-001, VAXstation II/ GPX, Nov. 1986; cover page, p. ii, pp. 1-1, 2-1 and 2-2; with Summary of the Auto-trol Software Protection Scheme.

White, Steven R., Comerford, Liam, "ABYSS: A Trusted Architecture for Software Protection," *Proceedings 1987 IEEE Symposium on Security and Privacy*, 1987, pp. 38–57.

Levine et al. "Network License Server", Oct. 1987.

(List continued on next page.)

*Primary Examiner*—Thomas C. Lee
*Assistant Examiner*—Larry J. Ellcessor
*Attorney, Agent, or Firm*—Rothgerber, Appel, Powers & Johnson

[57] ABSTRACT

License management systems and methods allow licenses for a computer program to be available for use at each of a plurality of nodes of a network. If a valid license file at a local node contains an unexpired, available license, a license manager at the local node permits the computer program to be executed at the requesting local node. If no such license is available in a valid license file at such local node, the license manager searches the other nodes for a valid license file containing an unexpired, available license. In one embodiment, if an unexpired available license is located in a valid license file at a second (or "remote") node, the license manager transfers such license to the local node, and assigns and encrypts a unique identification to such transferred license. The original record of the transferred license is modified by erasing it from the license file at the remote node so that the transferred license is no longer available there. In a second embodiment, the license manager modifies the license file to indicate use of the license at the local node without such transfer. The number of copies of the computer program that are authorized for execution simultaneously on the network is thus limited to the number of licenses that have been loaded into the license files on the network.

64 Claims, 5 Drawing Sheets

OTHER PUBLICATIONS

Howe "Apollo licenses concurrent users on entire network", Digital Review, vol.:v4, Issue: N. 20, p. 6.

Software Protection, by Dale and Doug Cabell, *Micro Communications,* vol. II, No. 5, May 1985, pp. 35–37.

The Promise of LANs: MIS Back in Control, by H. Glatzer, *Software News,* vol. V., No. 3, Mar. 1985, pp. 51–54, 56+.

Net Results, by Steven Cook, *PC World,* vol. III, No. 12, Dec. 1985, pp. 270–277.

Networks: LAN Licensing Lags, by Darcy DiNucci, *PC World,* Nov. 1985, pp. 320, 324 and 328.

Publishers Redefine Copy Protection as System of Controls, by D. S. Chartok, *Computer+Sofware News,* Mar. 10, 1986, p. 10.

Strength in Numbers, by M. Kramer, *PC Week,* Jul. 22, 1986, pp. 57–58.

RFS Architectural Overview, Conference Proceedings of the 1986 Summer USENIX Technical Conference and Exhibition, Atlanta, Georgia, pp. 248–259.

The Network File System Implemented on 4.3 BSD, by E. Gould, Conference *Proceedings of the 1986 Summer USENIX Technical Conference and Exhibition,* Atlanta, Georgia, pp. 294–298.

FST Introduces a Copy Protection Scheme for Nets, by Mary Petrosky, InfoWorld, vol. VIII, No. 7, Nov. 25, 1985, p. 14.

Stealing, by G. L. Pressman, Modern Office Technology, vol. XXX, No. 2, Feb. 1985, pp. 97, 100, 104 and 106.

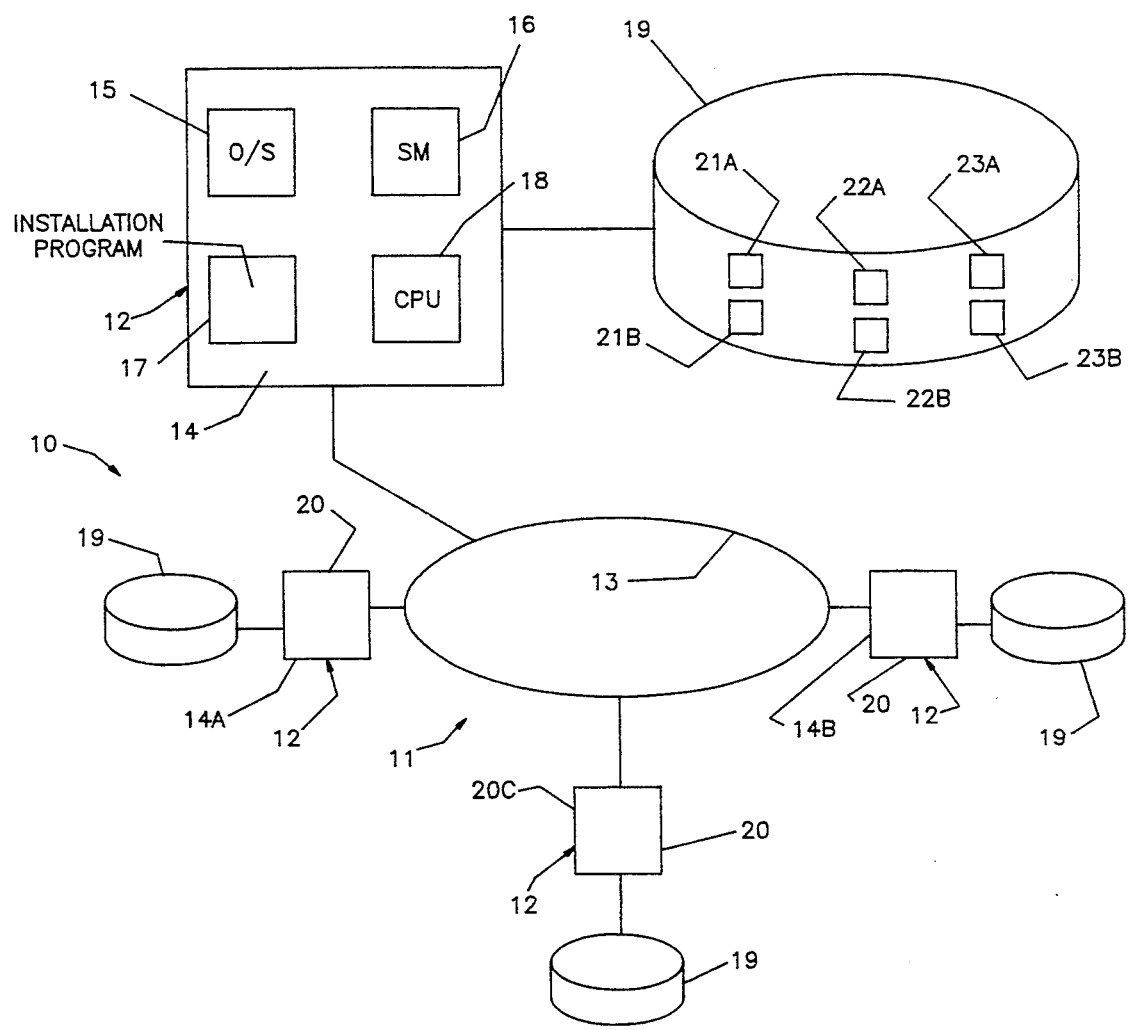

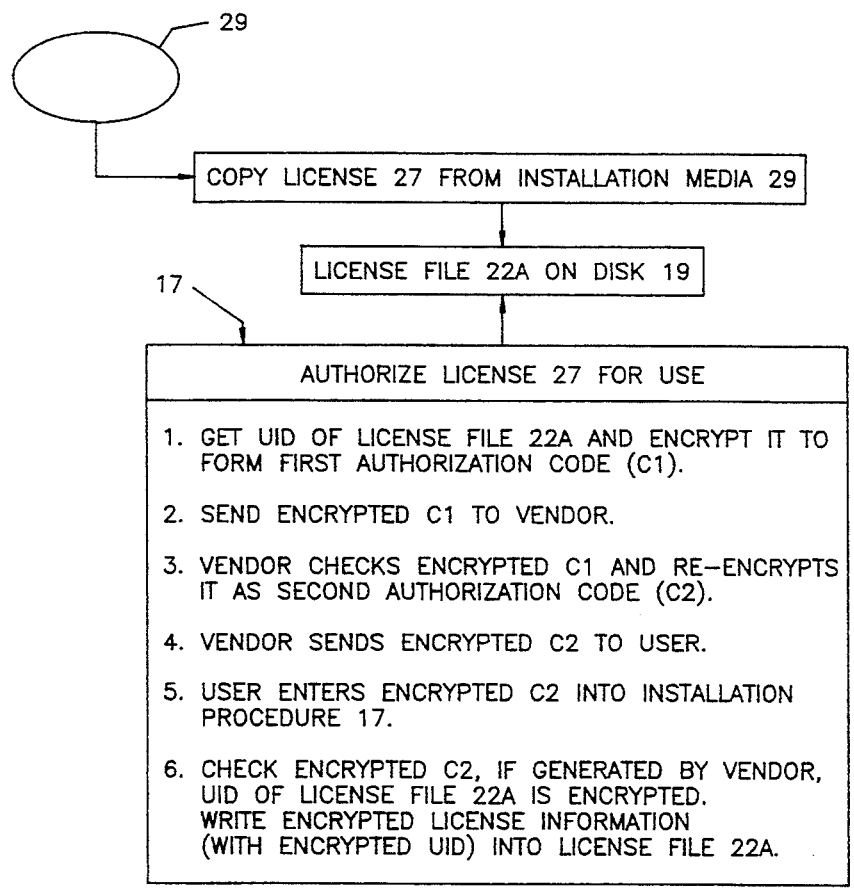
FIG. 4
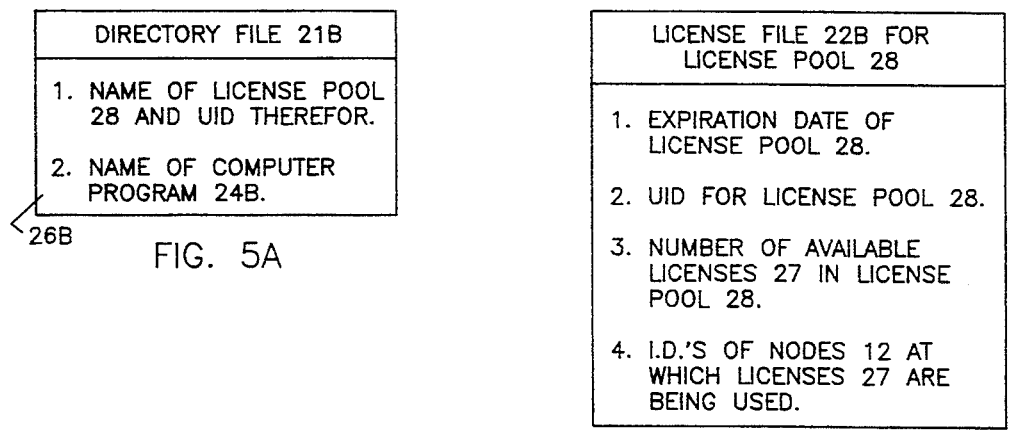
FIG. 5A
FIG. 5B
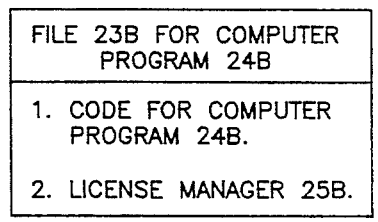
FIG. 5C

SYSTEM FOR CONTROLLING THE NUMBER OF CONCURRENT COPIES OF A PROGRAM IN A NETWORK BASED ON THE NUMBER OF AVAILABLE LICENSES

BACKGROUND OF THE INVENTION

1. Field of the Invention

The present invention relates to the field of controlling the use of computer programs and more particularly to the field of managing the availability of licenses for computer programs on nodes connected in a network.

2. Description of the Prior Art

In the past, various attempts have been made to prevent unauthorized copying and use of computer programs. So-called copy protection methods and devices were developed to control use of a computer program on a stand-alone computer, such as a personal computer (PC). Such PC would include a CPU, system memory and, optionally, a disk storage device such as a disk drive, referred to simply as a disk. In general, there are limitations when such copy protection is used and many PC's ,are connected together by a network link to form a computer network.

When PC's are connected together to form a network, the PC's can be called nodes of that network. Such network can also include a file server, which functions as a central, master controller of system data, including the availability of a computer program for use at a given node. Some file server systems cause an application program to check the serial number on the file server on which it is running. For example, in "Software Protection," an article by Doug and Dale Cabell published in *Micro Communications*, Vol. 2, No. 5, May, 1985, p. 35–37, it is noted that the application program checks the serial number by making a special network call and comparing the result with the expected response. The application program receives a completion code if the numbers match. To prevent the application program from running if the numbers do not match, the user is logged off the network.

Other systems that control the running of computer programs require a specific hardware board on a node on which the computer program is to run. The applicability of such systems is thus limited to workstations that have the required hardware board. One hardware-based copy protection approach includes an identifying code in the hardware board at a given node and requires the protected computer program to carry a matching code in order to function at that node. Such approach solves the copy protection problem with respect to the computer program since an unauthorized copy would not have an identifying code that matches the identifying code of the workstation's hardware board. However, such copy protection approach doesn't address the situation in which the demand for running copies of the computer program simultaneously is in excess of the number of authorized licenses for such computer program, where the authorized number can be executed on any of the nodes of the network.

Even though these and other methods and systems have been proposed, the literature indicates that users are still experiencing problems in the use of networks in which limitations are placed on how many copies of a given computer program may run simultaneously on the network.

SUMMARY OF THE INVENTION

An object of the present invention is to provide methods and systems for controlling the use of computer programs.

Another object of the present invention is to manage the availability, on nodes connected in a network, of licenses for computer programs that are to run on such nodes.

A related object of the present invention is to enable a copy of a given computer program to be executed on any node of a network at any time, provided that, at the time a request is made to execute such copy at a particular node, the aggregate number of other copies of the given program that are being executed on the network is one less than the number of licenses for such given program that are authorized to be executed simultaneously on the network.

Yet another object of the present invention is to provide a license file on a node of a network, such license file including, first, at least one license that is effective to authorize the execution of a copy of a given computer program and, secondly, a unique identification; wherein a facility is associated with such copy of the given computer program for determining that such unique identification is valid before such license is used to authorize the execution of such copy of such given computer program.

A further object of the present invention is to provide licenses that can be transferred from node to node to allow the execution of a particular computer program at a particular node, where the transfer of the licenses is controlled by an identification that is assigned to each license and that is unique according to the particular node to which the license is transferred.

A still further object of the present invention is to provide for each computer program in the network, a license manager facility that enables a copy of the computer program to run on a particular node if a license file containing at least one license has a unique identification that matches a system record of such identification, and when such a valid license file is not at such particular node, the license manager facility searches other nodes for a valid license file having a license that is available for use at such particular node.

An additional object of the present invention resides in a license manager facility that transfers an available license from a remote node to a local node at which it is desired to use a computer program, wherein the facility assigns a new unique identification to the transferred license at the local node and erases the record from the remote node so that the license is effective only at the local node to which it was transferred.

With these and other objects in view, a management system according to the present invention is provided for controlling the operability of computer programs on any of a plurality of nodes (or workstations) coupled together in a network. The vendor of the computer programs may require that a license be available for each such node at which one or more of said computer programs are to run. However, the owner of the network may want the number of licenses that are to be available for a given computer program on such network to be less than the total quantity of the nodes that are included in the network, or at least less than the aggregate number of copies of the computer program that all network users could possibly want to run simultaneously. The system accommodates the interests of both the vendor and the network owner as follows.

To serve the interests of the network owner, the total quantity of licenses to be loaded on the network may be less than the total quantity of the nodes in the network and, in any event, is generally less than the aggregate number of copies of the computer program that all network users could possibly want to run simultaneously. In a general sense, a license file is provided on the network, such as on a particular node. In one embodiment of the present invention the license file may include just one such license and many such license files are loaded onto one or more nodes. In another embodiment of the present invention, the license file may include any number of licenses for the given computer program. A system facility (such as an operating system) assigns to each license file a unique identification (UID) that is different from the UID of all other ones of the license files. In response to a request for operation of a copy of the given computer program at a selected node, the license file is searched to determine whether the license file is valid, which requires comparison of the UID of the license file to the UID assigned by the system facility to that license file. If such UIDs match, a further determination is made as to whether one of the licenses in such license file is available for use at the selected node. In response to locating the available license in the valid license file, the management system enables the computer program at the selected node to run. If no valid license file is located, or if all valid license files contain licenses that are in use, or unavailable, then the management system returns a status to the computer program indicating that it is not authorized to run.

Other objects of the present invention relate to a method of managing licenses to limit the number (S) of copies of a given computer program that are executing simultaneously on the nodes of a network. Such limiting is according to the number (L) of licenses for the given computer program that are available on such network. To protect the interests of the computer program vendor, the method limits S to less than or equal to L. Each of the nodes at which a copy of the given computer program is executing has license memory (such as a disk) and system memory. The license memory stores license files that include one or more licenses for the given computer program, and a directory file. The directory file contains the name of the license file and the UID for such license file.

The method includes the steps of installing a given computer program onto the license memory of at least one of the nodes of the network. The computer program is current with respect to time when its term of authorized use has not expired. The next step is loading one or more license files onto the license memory of at least one node of the network. In a first embodiment of the present method, the license file contains one license for the given computer program and many license files are used to provide L licenses. In a second embodiment of the present method, only one license file need be used, and such license file contains L licenses.

The loading is followed by assigning to each of the loaded license files an identification that is unique to the license file at the time of such loading. A license is inactive when it has not been used to authorize the execution of a copy of the computer program. The nodes are referred to as local nodes or remote nodes. The local node is the node at which a user desires to run the computer program. The remote node is any other node in the network.

In the first embodiment, the license in the license file can only authorize the execution of a copy at the local node on which the license file is stored, and the license files are transferred, if necessary, to the local node. In the second embodiment, any license in the license file can authorize use of a copy of the given computer program at any local or remote node.

In response to a request to run a copy of the given computer program at a local node, the directory at the local node is searched for a license file. Upon determining that no such license file is valid, or if valid, that no licenses therein are available, directories at the remote nodes are searched for a license file that is valid.

In the first embodiment, if the license file at the remote node is valid and the license therein is inactive and thus available, the inactive current license located at the remote node is transferred to the local node. Then, a unique identification is assigned to the license that was transferred to the local node and the license file is erased from the remote node. A status is returned to the computer program indicating that it has a license and is allowed to run on the local node.

In the second embodiment, if a valid license file is located at a remote node, and a license therein is available, a license manager associated with the copy at the local node authorizes use of the copy and modifies the record in the license file at the remote node to indicate that such available license is now in use.

BRIEF DESCRIPTION OF THE DRAWINGS

Other objectives, features and advantages of the present invention will be apparent from an examination of the following detailed descriptions which include the attached drawings in which:

FIG. 1 is a block diagram of a computer network showing nodes connected in a network by a network link; where fewer licenses are available on the network for a given computer program than the possible demand for such licenses;

FIGS. 2A, 2B and 2C are block diagrams of a portion of a disk at a node, showing for a first embodiment of the invention a directory file for indicating that a license file and a computer program are on the node, and showing a license manager program in a computer program file for controlling the use of a copy of the computer program according to whether the license file is valid and contains an available license;

FIG. 4 is a flow chart showing how a license of the first embodiment of the invention is initially loaded into a license file on a node and a unique identification is assigned to the license file, wherein such unique identification is changed each time the license is transferred to a different node;

FIGS. 5A, 5B and 5C are block diagrams of a portion of a disk at a node, showing for a second embodiment of the invention a directory file for indicating that a license file and a computer program are on a node, where the license file contains a license pool including many licenses, and showing the license file and a license manager program in a computer file;

DESCRIPTION OF THE PREFERRED EMBODIMENTS

General Description

Figure 3:
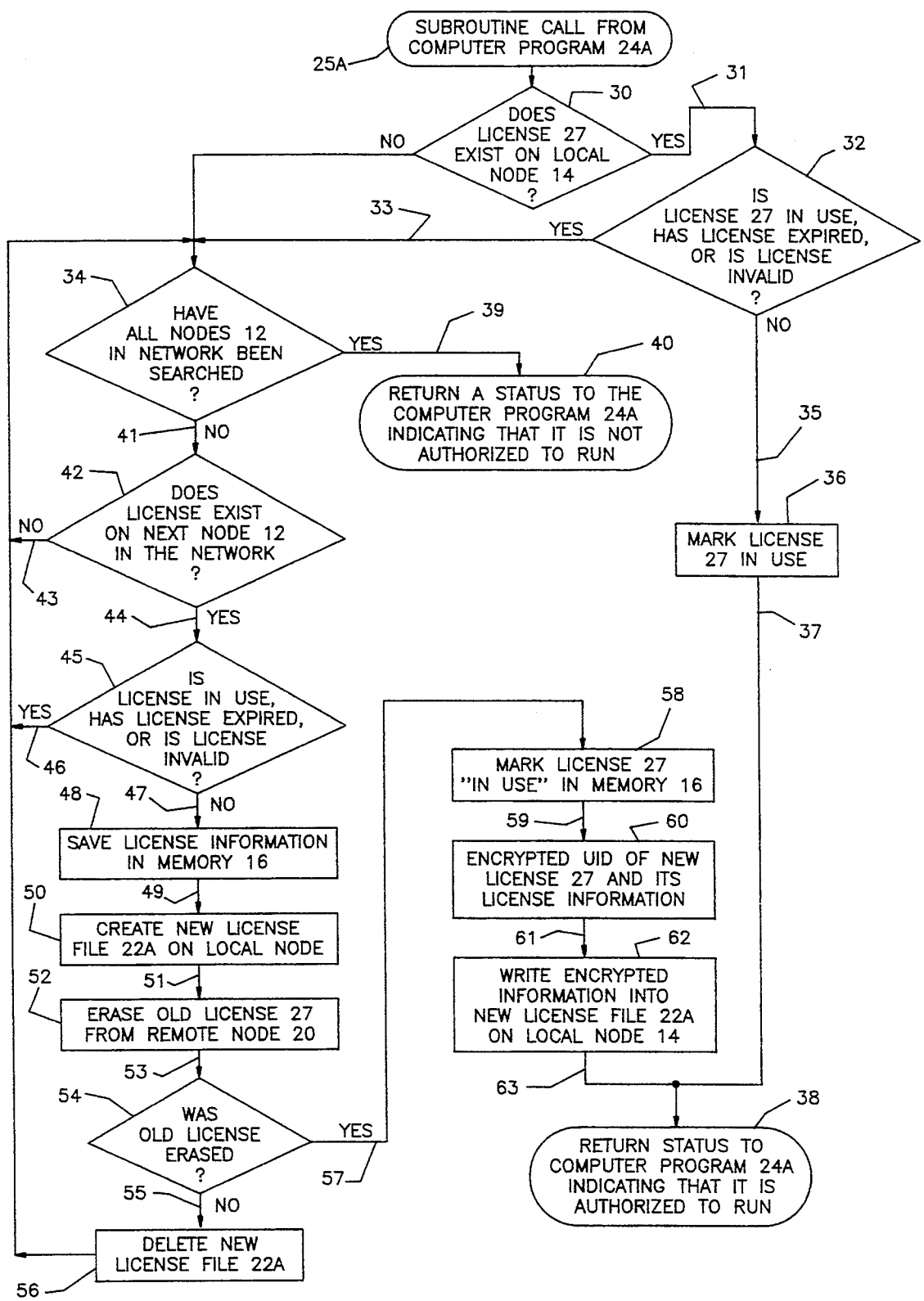
FIG. 3 is a flow chart showing the functions performed by the license manager program of the first embodiment of the invention to enable a copy of the computer program to be executed at a local node both when a license is or is not initially on and available for use on the local node.

Referring now to FIG. 1, the management system 10 of the present invention is shown for use with a network 11 having a plurality of nodes 12 that are interconnected by a network link 13. For purposes of description, one of the nodes 12 is referred to as a local or first node 14. Any of the nodes 12 may be a local node 14. Each node 12 includes an operating system 15, system memory 16, an installation program 17 and a CPU 18. The nodes 12 also include a peripheral storage device such as a disk 19. The nodes 12 other than the local node 14 are referred to as remote nodes 20 with respect to the local node 14.

Files of License Transfer Embodiment

As shown in FIGS. 1, 2A through 2C, and FIGS. 5A through 5C, there are files in the disk 19. For a first embodiment of the present invention (referred to as the license transfer embodiment for convenience), the files include a directory file 21A (FIG. 2A), a license file 22A (FIG. 2B) and a computer program file 23A (FIG. 2C). A computer program 24A in the file 23A may be a standard applications program, such as the Series 5000 Advanced Graphics Software program marketed by Auto-trol Technology Corporation. The computer program file 23A may also include a license manager computer program. For the license transfer embodiment, the license manager computer program is referred to as a license manager 25A and is shown in detail in FIG. 3. A directory 26A of the license transfer embodiment is contained in the directory file 21A. The license file 23A may or may not be on the disk 19, depending upon conditions at any particular time in the operation of the network 11. For the license transfer embodiment, the license file 22A contains one license 27.

Files of License Pool Embodiment

For a second embodiment of the present invention (referred to as the license pool embodiment for convenience) the license file is referred to by the reference number 22B (FIG. 5B) and may have as many licenses 27 therein as the number of copies of a given computer program 24B (FIG. 5C) that are authorized to be run simultaneously. Similarly, the directory file is referred to by the reference number 21B (FIG. 5A) and contains a directory 26B relating to a license pool 28 that is in the license file 22B. The computer program 24B is in a computer program file 23B (FIG. 5C) and is associated with a license manager referred to by the reference number 25B (FIG. 5C). The computer program 24B may be a different applications computer program, for example, from the computer program 24A.

Control of Computer Programs 24A and 24B

The apparatus and the methods of the present invention are effective to control the execution of the computer programs 24A and 24B on the local node 14, for example. Initially, the computer programs 24A and 24B will be in the respective computer program files 23A and 23B on the local node 14 or on one of the remote nodes 20. In either case, when a user wants to run a copy of the computer programs 24A and 24B on the local node 14, the computer programs 24A and 24B and the respective license manager 25A or 25B will be written from the respective computer program file 23A or 23B into the system memory 16 at the local node 14. Further, under the control of the owner of the network 11, fewer licenses 27 may be stored on the nodes 12 of the network 11 than the aggregate number of nodes 12 in the network 11. Also under the owner's control, since many copies of the computer programs 24A or 24B may be operated simultaneously at a given node 12, the number of licenses 27 stored in the license files 22A—22A or in the license file 22B on the nodes 12 need not be related to the number of nodes 12, and may be less than the total possible number of copies of the given computer program 24A or 24B that all network users desire to execute simultaneously. The computer program vendor's interests are protected since the owner must purchase the licenses 27 for the given computer programs 24A and 24B, and the total quantity of licenses 27 purchased will limit the total quantity of copies of the given computer programs 24A and 24B that can be executed simultaneously.

The operating system 15 assigns an identification to each license file 22A or 22B, such as the license file 22A containing the license 27 at the local node 14. In connection with the installation program 17 at the local node 14, the assigned identification is unique to the license file 22A or 22B that was stored on the local node 14 at a particular time. For ease of expression, the identification assigned to a given license file 22A or 22B at a given node 12 at a particular time is referred to as the UID.

When a user at the local node 14 makes a request to run the computer programs 24A or 24B on the local node 14, the respective license manager 25A or 25B is effective to search the respective directory 26A or 26B of the respective license file 22A or 22B at the local node 14 to determine whether one of the license files 22A or 22B is on the local node 14. If so, then the actual UID of such license file 22A or 22B is compared to the UID for such license file 22A or 22B that was assigned to it by the operating system 15. If the compared UID's are the same, the respective license manager 25A or 25B then determines whether a license 27 in such respective license file 23A or 23B is available to be run on the local node 14. If such license 27 is available and if such license 27 has not expired, then the respective license manager 25A or 25B enables the computer program 24A or 24B at the local node 14 to run on the local node 14.

Methods of the present invention may be used for controlling the execution of the computer programs 24A and 24B on the local node 14 when the license files 22A or 22B are on the disk 19 of the local node 14. Such methods may also be used when no license file 22A or 22B is at the local node 14 at the time of a request to run the computer programs 24A or 24B on the local node 14. In both cases, the methods manage the licenses 27 to limit the number of copies of the computer programs 24A or 24B that may be run simultaneously on the nodes 12 of the network, where such limiting is according to the aggregate number L of the licenses 27 that are available on the network 11.

In the use of one method, after loading of the computer program 24A or 24B onto at least one node 12, the desired number L of licenses 27 is loaded onto any desired ones of the nodes 12. In the license transfer embodiment, this is done by loading the desired number L of license files 22A onto selected ones of the nodes 12, or in the license pool embodiment by loading as few as one license file 22B onto one node 12, where such license file 22B contains the license pool 28 having the desired number L of licenses 27. Such number L of licenses 27 for the computer programs 24A or 24B is generally less than the total quantity of the nodes 12 of the network 11. However, when it is desired to run more than one copy of the computer program 24A on any given node 12, the total number L of licenses 27 loaded onto the network 11 would be less than the aggregate number of copies of the computer program 24A that all network users could possibly want to run simultaneously.

Each license file 22A or 22B that is loaded onto a node 12 is assigned a UID. In response to a request at the local node 14 to run a copy of the computer program 24A or 24B, the respective directory 26A or 26B at the local node 14 is searched and, in this example, it is determined that no license file 22A or 22B is on the disk 19 of such local node 14. The directories 26A—26A or 26B—26B respectively of the remote nodes 20—20 are then searched. Upon locating the license file 22A or 22B at one of the remote nodes 20—20, the UID contained in the respective license file 22A or 22B is compared to the UID corresponding to such license file 22A or 22B that the operating system 15 caused to be written into the respective directory 26A or 26B at such remote node 20. If such UID's match, then in both embodiments a determination is made as to whether the license 27 in the respective license file 22A or 22B is in use, and if not, the computer program 24A or 24B that was the subject of the request to run on the local node 14 is then enabled to run.

In the license transfer embodiment, when the UID's match and the license in the license file 22A is available, then the license file 22A is modified by causing the license 27 at the remote node 20 to be transferred to the system memory 16 in the local node 14. The operating system 15 at the local node 14 then assigns a new UID to the transferred license 27 and writes such UID into the system memory 16 at the local node 14. The modification of the license file 22A at the remote node 20 is completed by erasing the license 27 so that only one license 27 exists on the network 11 corresponding to the original license 27 that was at the remote node 20. Then the record of the transferred license 27 in such system memory 16 and the new UID for such transferred license 27 are identified as being in use (FIG. 2B). The new UID of the transferred license 27 and the other license information shown in FIG. 2B are encrypted and as encrypted are stored in the system memory 16 at the local node 14. The encrypted information for the transferred license 27 is then written to the disk 19 at the local node 14.

In the license pool embodiment, when the UID's match and any license 27 in the license pool 28 of the license file 22B is available, the license file 22B is also modified by decrementing the number of available licenses 27 therein (FIG. 5B) so that the available pool of licenses 27 is one less.

DETAILED DESCRIPTION OF LICENSE TRANSFER EMBODIMENT

Referring now to FIG. 1 in detail, each node 12 of the network 11 may be a stand-alone computer, such as an Apollo DN3000 computer, for example. Such computer has the CPU 18, the system memory 16 and in such memory 16 the operating system 15 and the installation program 17.

In the initialization of each node 12 of the network 11, each computer program 24A that is to be run on any of the nodes 12, such as the local node 14 or the remote node 20, is loaded onto at least one of the nodes 12 in a standard manner. FIG. 2C shows the file 23A on the disk 19 for the computer program 24A, including the license manager 25A.

License Loading Procedure

Referring now to FIG. 4, the aggregate number L of licenses 27 loaded onto the nodes 12 is determined by how many copies of the given computer program 24A the owner of the network 11 has purchased. Thus, as to that given computer program 24A, the number L of licenses 27 that have been purchased is the maximum number of copies of such given computer program 24A that are permitted to run at any given time. For example, if there are ten nodes 12 included in the network 11, and if a maximum of three copies of the given computer program 24A can run on any given node 12 at any one time, then there can be a demand to run thirty copies of the given computer program 24A at any particular time. However, if only ten licenses 27 are loaded onto the network 11 for the given computer program 24A, the license managers 25A—25A (FIGS. 2C and 3) will permit only ten of the thirty copies of the computer program 24A to run at any given time. Thus, when either fewer licenses 27 than the aggregate number of nodes 12 (where only one copy of the given computer program 24A can run on one node 12), or when fewer licenses 27 than the total demand for licenses (where more than one copy of the given computer program 24A can run on a node 12) are loaded onto the network 11, the license managers 25A—25A are effective to limit the aggregate number of copies of the given computer program 24A that can run on the network 11 at any given time.

FIG. 4 illustrates the steps utilized to load a given license 27 onto a node 12 of the network 11. Initially, the license 27 is copied from an installation media 29 onto the license file 22A on the disk 19 at the local node 14, for example. As shown in FIG. 2B, the license file 22A will include at least an expiration date for the license 27. At the same time, the operating system 15 assigns a UID to the license file 22A. Since there is only one license 27 in the license file 22A, such UID is thus the UID of the license 27 as well. At this juncture, the license 27 is not yet authorized. To authorize the license 27, the installation program 17 reads the UID of the license file 22A from the disk 19 and encrypts it to form a first authorization code, referred to as C1. The user or customer calls the vendor of the computer program 24A that has been loaded onto the local node 12 and advises the vendor of the encrypted C1. The vendor checks the encrypted C1 to determine whether the license 27 is an authorized license 27. If so, the vendor re-encrypts the C1 in a different form to form a second authorization code, referred to as C2. The vendor sends the encrypted C2 to the customer. The customer then enters the encrypted C2 into the installation program 17, and the installation program 17 checks the encrypted C2 to see if it was generated by the vendor's computer program. If so, the installation program 17 encrypts the UID of the license file 22A and the other license information of the license file 22A and writes it into the license file 22A on the disk 19 of the local node 14. It is to be understood, then, that the UID is stored with the license 27 in the license file 22A on the local node 14 before any request to use the given computer program 24A has or can be made.

This license loading procedure is then repeated until the desired aggregate number L of license files 22A having an aggregate of L licenses 27 for the given computer program 24A have been loaded onto the nodes 12 of the network 11. At this juncture, the network 11 will have been loaded with at least one copy of the given computer program 24A and with the desired aggregate number L of licenses 27 for the given computer program 24A. The network 11 is ready for a user to make a request to run a copy of the given computer program 24A on one of the nodes 12, such as on the local node 14.

Request to Run Computer Program 24A on Local Node 14

The method and apparatus of the license transfer embodiment of the present invention may be understood by referring to FIG. 3. There, the functions performed by the license manager 25A are shown in flow chart form. Initially, it should be understood that one license manager 25A (FIG. 2C) is part of each copy of the given computer program 24A that is contained in a computer program file 23A. In a preferred embodiment of the present invention, this can be achieved by having the computer program 24A in the file 23A on the disk 19 include the license manager 25A, such that as each copy of the computer program 24A is written into the system memory 16 at a given node 12, the corresponding license manager 25A will also be written into the system memory 16.

Each license manager 25A performs the functions shown in FIG. 3 with respect to its respective copy of the given computer program 24A. Assume for purposes of illustration that the customer's network user desires to use a copy of the given computer program 24A at the local node 14. The copy of the given computer program 24A on the local node 14 contacts the license manager 25A at the local node 14 by making a subroutine call. In response, the license manager 25A asks (Step 30) whether a license 27 exists on the local node 14 for the given computer program 24A. This question first causes a determination to be made as to whether there is a license file 22A (and thus a license 27) on the disk 19 at the local node 14. If so, the license manager 25A takes a "yes" path 31 and in step 32 determines whether such license 27 is then "in use" or "active". That is, such determination made by the step 32 indicates whether the CPU 18 is at that time "using" the license 27 by running a copy of the computer program 24A on the local node 14 under the authorization of such license 27. If so, the license manager 25A then takes a "yes" path 33 and returns to a next step 34. If the license 27 is not active on the local node 14, the license manager 25A then determines whether the inactive license 27 is "valid". This is done by asking the operating system 15 for the UID for the license 27 that the operating system 15 caused to be stored in a record in the system memory 16 at the local node 14. The license manager 25A then decrypts the UID contained in the license file 22A for the license 27 and compares it to the UID for such license 27 that was received from the operating system 15. The license is not valid if the UIDs are not the same. In such event, then the license manager 25A takes the "yes" path 33 and returns to the step 34. If the UIDs are the same, the license manager 25A then determines whether the current date is later than the expiration date of the inactive license 27 (see FIG. 2B). If so, then the license 27 has "expired" and the license manager 25A takes the path 33 and returns to the next step 34. If not expired, the license manager 25A then takes a path 35 indicating that the license 27 is inactive, current and valid. The path 35 leads to step 36 that now marks such license 27 as being "active" or "in use" in response to the new request to use the computer program 24A (see item 2 in file 22A, FIG. 2B). This prevents the inactive, current, valid license 27 from being assigned to any other node 12. The license manager 25A then takes a path 37 to a step 38 that returns a status to the computer program 24A indicating that it is authorized to run, which enables the computer program 24A to run on the CPU 18 at the local node 14.

Request for License 27—License at Remote Node 20

As indicated above, with respect to the local node 14, the questions asked in step 32 can be answered in the affirmative or negative and if any one is answered "yes", it results in no license 27 being available for the computer program 24A on the local node 14. In any "yes" event, the license manager 25A then returns via path 33 to step 34. In step 34 the nodes 14 and 20—20 that have been searched are noted. If all nodes have been searched, a "yes" answer is given and a path 39 is taken to step 40. If, as in the example, the first remote node 20 has not been searched, path 41 is taken to step 42. Step 42 determines whether a license 27 exists on the next node 12 in the network 11 which in this example, is the first remote node 20. If the license 27 is not in the license file 22A on the remote node 20, then a "no" path 43 is taken and the license manager 25A performs step 34 and determines whether all nodes 12 have been searched for a license 27. In this example, since only the local node 14 and the first remote node 20 have been searched, the "no" path 41 is taken and the license manager 25A loops to step 42 and then again determines whether a license 27 exists on the next or second remote node 20 in the network 11. Assuming the next node 12 is the next remote node counterclockwise around the network 11, and that a license 27 exists in the license file 22A on the disk 19 in such remote node 20, then a "yes" path 44 is taken to a step 45. The license manager 25A then determines (as described above in respect to step 32) whether the license 27 in the license file 22A on the second remote node 20 is in use or whether the expiration date has expired or whether it is invalid. In any of these events, a "yes" path 46 is taken to the step 34 and the determination as to whether all nodes 12 have been searched is again made.

Transfer of License 27 to Local Node 14

If the license 27 in the license file 22A on the second remote node 20 has not expired, is not in use and is valid, a "no" path 47 is taken to a step 48. The step 48 is the first step in the transfer of the license 27 to the local node 14. The license 27 so transferred is referred to as a "transferred license". In step 48, the license manager 25A causes the license 27 to be stored in the system memory 16 at the local node 14. The license manager 25A then takes path 49 to a step 50 that causes the operating system 15 at the local node 14 to create a new empty license file 22A on the local node 14 at which it is desired to use the copy of the computer program 24A. In step 50, the operating system 15 also assigns a new unique identification (UID) to the license 27 and causes same to be written into the system memory 16 at the local node 14. A path 51 leads from step 50 to the next step 52 in the transfer operation, which is to delete or erase the transferred license 27 from the license file 22A at the second remote node 20. The license manager 25A requests the operating system 15 to effect such erasure. The erasure is effected only if the transferred license 27 has not previously been erased from the license file 22A at the second remote node 20. A path 53 is taken to step 54 that asks whether such erasure was done. If such erasure has not been accomplished, the operating system replies by sending a "no" message to the license manager 25A and a path 55 is taken to step 56. Step 56 deletes the new license file 22A from the second remote node 20 and the program returns to step 34 so that the "all nodes searched?" question is asked again.

Referring to FIG. 1, assuming the transferred license 27 was erased from the license file 22A at the second remote node 20, this leaves only the transferred license 27 in the system memory 16 at the local node 14, such that it is no longer possible to use the transferred license 27 on the second remote node 20. Moreover, such erasure deals with the situation in which users at two different nodes 12 both want to use a copy of a computer program 24A that is not at each user's respective local node 14, but is, for example, at a remote node 20B. In this situation, the first user (e.g. at the node 14A) to complete the erasure step 52 (by erasing the transferred license 27 from the license file 22A at the remote node 20C) will be enabled to use such transferred license 27. When the license manager 25A on the other local node 14B attempts to again erase the transferred license 27 from the license file 22A at the remote node 20C, the message from step 54 will prevent completion of the transfer of the license 27 to the local node 14B, such that the request from the local node 14B is processed further by performing the "all nodes searched?" step 34.

After erasure from the second remote node 20C, the license manager 25A takes path 57 to step 58 that identifies the transferred license 27 in the system memory 16 at the local node 14 as being "in use" so as to prevent a user at a different node 12 from having access to the transferred license 27 and transferring it away from the local node 14. The license manager 25A then takes path 59 to step 60 and encrypts all of the data or license information (see FIG. 2B) of the transferred license 27, including the UID of the new license file 22A, that is in the system memory 16 at the local node 14. The license manager 25A then takes path 61 to step 62 and writes this encrypted license information into the new license file 22A on the disk 19 at the local node 14. Path 63 is taken to the step 38 that returns the status to the computer program 24A indicating that the computer program 24A is authorized to run, which enables the computer program 24A to run on the CPU 18 at the local node 14.

The flow chart in FIG. 3 can also be expressed in terms of instructions that are used by the license manager 25A to cause the above-described functions to be performed. Such instructions are set forth in Appendix A.

DETAILED DESCRIPTION OF LICENSE POOL EMBODIMENT

Referring again to FIG. 1 in detail, the network 11 is also used for the license pool embodiment, and thus each node 12 includes the CPU 18, the system memory 16 and in such memory 16 the operating system 15 and the installation program 17.

In the initialization of each node 12 of the network 11, each computer program 24B that is to be run on any of the nodes 12, such as the local node 14 or the remote node 20, is loaded onto at least one of the nodes 12 in a standard manner. FIG. 5C shows the file 23B that is on the disk 19 for the computer program 24B, including the license manager 25B.

License Loading Procedure

Figure 7A:
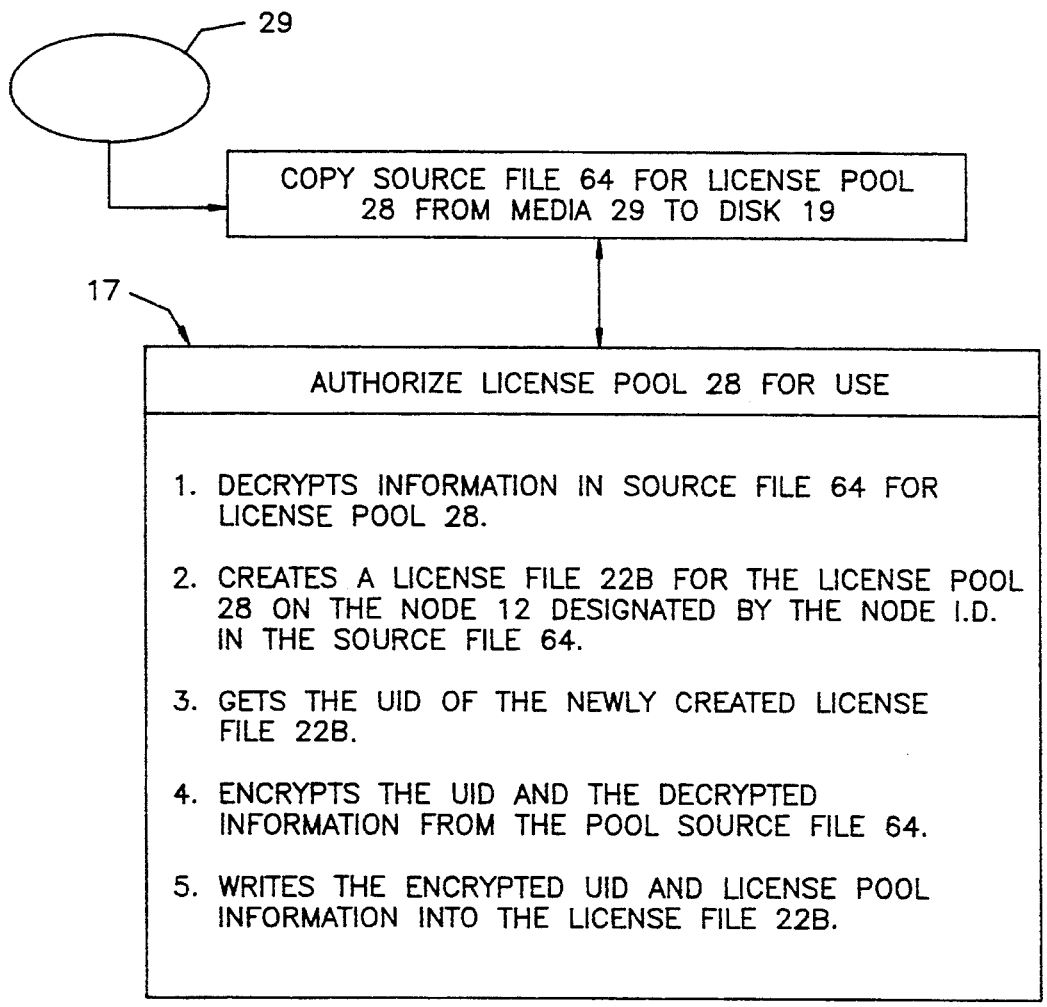
FIG. 7A is a flow chart showing how a license file of the second embodiment is initially loaded onto a node and assigned a unique identification.

Referring now to FIG. 7A, the aggregate number L of licenses 27 loaded onto the nodes 12 is determined by how many copies of the given computer program 24B the owner of the network 11 has purchased. When either fewer licenses 27 than the aggregate number of nodes 12 (where only one copy of the given computer program 24B can run on one node 12), or when fewer licenses 27 than the total demand for licenses (where more than one copy of the given computer program 24B can run on a node 12) are loaded onto the network II, the license managers 25B—25B are effective to limit the aggregate number of copies of the given computer program 24B that can run on the network 11 at any given time.

Figure 7B:
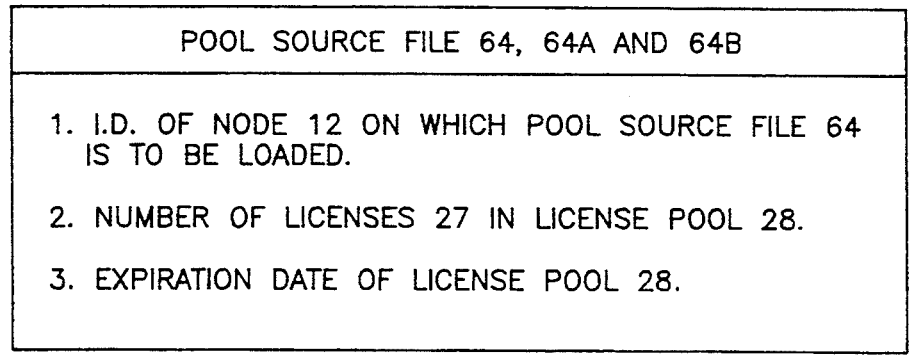
FIG. 7B is a chart showing a pool source file that is supplied to a customer for providing licenses for the second embodiment of the present invention.

FIG. 7B shows a pool source file 64 that is stored on the media 29 that the owner of the network 11 receives from the vendor. The file 64 includes the i.d. of that node 12 onto which the license file 22B for the license pool 28 is to be loaded, the total number L of licenses that are to be authorized for the computer program 24B and the expiration date of the license pool 28. One of the pool source files 64 may be loaded onto various ones of the nodes 12, and in that case L1 licenses would be in one file 64A and L2 licenses would be in another file 64B, where L1+L2=L.

FIG. 7A illustrates the steps utilized to load the licenses 27 onto the node 12 of the network 11 according to the node i.d. in the file 64. Initially, the pool source file 64 is copied from the installation media 29 onto any node 12, such as on the local node 14. The installation program 17 decrypts the information in the source file 64 for the license pool 28. The installation program 17 creates the license file 22B on the disk 19 of the node 12 corresponding to the node i.d. in the source file 64 (see FIG. 7A, item 2), and the operating system 15 then assigns a UID to that license file 22B. Since there may be many licenses 27 in that license file 22B, such UID is the UID that is common to all of the licenses 27 in the license pool 28. At this juncture, the license pool 28 is not yet authorized. To authorize the license pool 28, the installation program 17 gets the UID of the license file 22B from the operating system 15 and the installation program 17 encrypts the UID of the license file 22B and the other license information of the pool source 64 and writes it into the license file 22B on the disk 19 of the node 12, as designated by the node i.d. It is to be understood, then, that the UID is stored with the license pool 28 and with the L licenses 27 in the license file 22B on the designated node 12 before any request to use the given computer program 24B has or can be made.

As compared to the license transfer embodiment, the license pool embodiment is preferred because the installation of the license source pool 64 can be performed by the owner of the network without contacting the vendor. Also, if one license pool 28 is used, for example, only one loading operation is required. To provide more access to the licenses 27 should one node 12 be inoperative, however, it is preferred that at least two license pools 28—28 be used, and installed on separate nodes 12, one having L1 and the other having L2 licenses 27 as noted above.

At this juncture, the network 11 will have been loaded with at least one copy of the given computer program 24B and with the desired aggregate number L of licenses 27 for the given computer program 24B. The network 11 is ready for a user make a request to run a copy of the given computer program 24B on one of the nodes 12, such as on the local node 14.

Request to Run Computer Program 24B on Local Node 14

Figure 6:
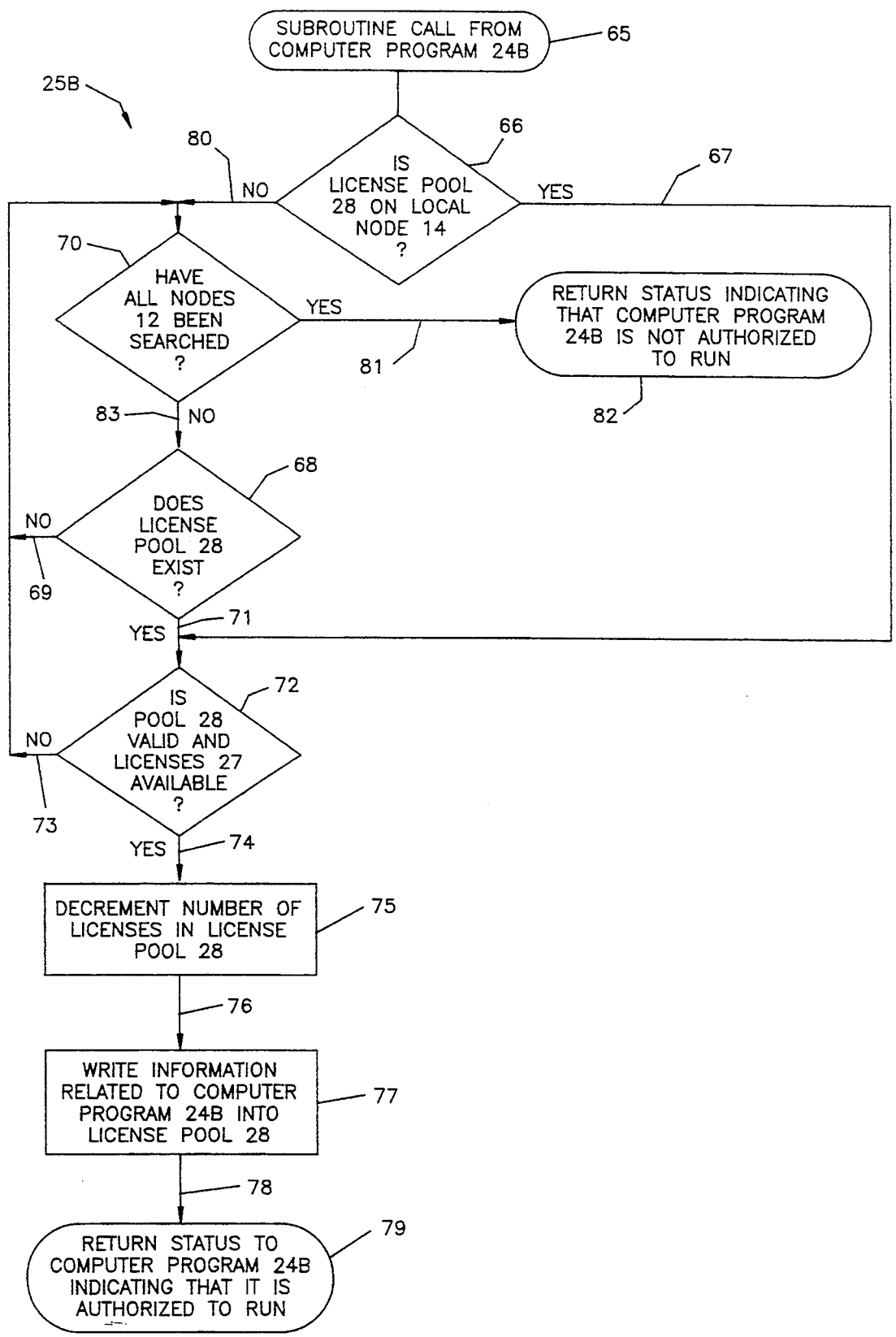
FIG. 6 is a flow chart showing the functions performed by the license manager program of the second embodiment for controlling the use of a copy of the computer program according to the validity of the license file and whether the license pool includes an available license.

The method and apparatus of the license pool embodiment of the present invention may be understood by referring to FIG. 6. There, the functions performed by the license manager 25B are shown in flow chart form. Initially, it should be understood that one license manager 25B (FIG. 5C) is part of each copy of the given computer program 24B that is contained in a computer program file 22B in system memory 16. In the preferred embodiment of the present invention in which the Apollo DN3000 computer is used, separate files 23B for the computer program 24B and the license manager 25B are on the disk 19. When the files 23B are loaded into the system memory 16, they are linked. On the other hand, such linking can also be achieved by having the computer program 24B in the file 23B on the disk 19 be linked to the license manager 25B, such that as each copy of the computer program 24B is written into the system memory 16 at a given node 12, the corresponding license manager 25B will also be written into the system memory 16.

Each license manager 25B performs the functions shown in FIG. 6 with respect to its respective copy of the given computer program 24B. Assume for purposes of illustration that the customer's network user desires to use a copy of the given computer program 24B at the local node 14. The copy of the given computer program 24B on the local node 14 contacts the license manager 25B at the local node 14 by making a subroutine call (Step 65). In response, the license manager 25B in effect asks (Step 66) whether a license pool 28 exists on the local node 14 for the given computer program 24B. This question is answered by first causing a determination to be made as to whether there is a license file 22B (and thus a license pool 28 and a license 27) on the disk 19 at the local node 14. If so, the license manager 25B takes a "yes" path 67 and in a step 72 determines whether the license pool 28 is ¢valid". This is done by asking the operating system 15 for the UID for the license pool 28 that the operating system 15 caused to be stored in a record in the system memory 16 at the local node 14. The license manager 25B then decrypts the UID contained in the license file 22B for the license pool 28 and compares it to the UID for such license pool 28 that was received from the operating system 15. The license pool 28 is not valid if the UIDs are not the same. In such event, then the license manager 25B takes a "no" path 73 and proceeds to step 70. If the UIDs are the same, the license manager 25B determines whether the current date is later than the expiration date of the valid license pool 28 (see FIG. 5B). If so, then the license pool 28 has expired and the license manager 25B takes path 73 and returns to step 70. If not expired, the license manager 25B then determines whether any of the licenses 27 in the pool 28 are not in use. That is, such determination made by the step 72 indicates whether the CPUs 18 are at that time "using" all of the licenses 27 by running copies of the computer program 24B on the nodes 12 under the authorization of all such licenses 27. If all licenses 27 are being used, the license manager 25B then takes the "no" path 73 and returns step 70. If one license 27 is not active, the license manager 25B then takes a path 74 indicating that at least one of the licenses 27 is inactive, current and valid. The path 74 leads to step 75 that marks such license 27 as being "active" or "in use" (see item 3 in file 22B, FIG. 5B). This is done by modifying the license file 22B, such as by decrementing item 3 in file 22B to reduce the number of licenses 27 that are available in the license pool 28. This prevents that inactive, current, valid license 27 from being assigned to any other node 12. The license manager 25B then takes path 76 to step 77 that writes into the license pool 28 in the license file 22B information that the local node is using the license 27 that was just rendered active. The license manager 25B then takes path 78 to step 79 that returns a status to the computer program 24B indicating that it is authorized to run, which enables the computer program 24B to run on the CPU 18 at the local node 14.

Request for License 27—License at Remote Node 20

As indicated above, with respect to the local node 14, the question asked in step 66 can be answered in the affirmative or negative and if it is answered "no" it indicates that no license pool 28 and thus no licenses 27 are available for the computer program 24B on the local node 14. In the "no" event, the license manager 25B then takes path 80 to step 70. In step 70, the nodes 14 and 20—20 that have been searched are noted. If all nodes 14 and 20—20 have been searched, a "yes" answer is given and a path 81 is taken to step 82. If, as in the example, the first remote node 20 has not been searched, an attempt is made to locate the license pool 28 on the first remote node 20, path 83 is taken to step 68. Step 68 determines whether a license pool 28 exists on the next node 12 in the network 11 which in this example, is the first remote node 20. If the license pool 28 is not on the remote node 20, then the license manager 25B performs another search if all nodes 12 have not been searched for a license pool 28. In this example, since only the local node 14 and the first remote node 20 have been searched, the license manager 25B loops and then again determines whether a license pool 28 exists on the next or second remote node 20 in the network 11. Assuming the next node 12 is the next remote node counterclockwise around the network 11, and that a license pool 28 exists in the license file 22B on the disk 19 in such remote node 20, then "yes" path 83 is taken to step 68. The license manager 25B then determines (as described above in respect to step 72) whether the license pool 28 in the license file 22B on the second remote node 20 is valid, and if so, performs the rest of step 72 to determine whether any license 27 in the valid license pool 28 is available, and if so, whether the expiration date has expired. In either of these events (e.g. no license 27 available in the valid license pool 28 or license pool 28 is expired), the "no" path 73 is taken to the step 70 and the determination as to whether all nodes 12 have been searched is again made.

Use of License 27 on Local Node 14

If the license file 22B on the second remote node 20 has not expired and a license 27 is not in use and the pool 28 is valid, path 74 is taken to step 75. Rather than transferring the available, current license 27 from the license pool 28, the license manager 25B on the local node 14 causes step 75 to be performed in the license pool 28 at the second remote node 20, such that item 3 in the license file 22B (FIG. 5B) is decremented one unit. The accounting for the use of the license 27 only also requires performing step 75 instead of steps 50, 52, 54 and 60 as in the license transfer embodiment. Then step 79 is performed to return the status to the computer program 24B indicating that the computer program 24B is authorized to run, which enables the computer program 24B to run on the CPU 18 at the local node 14.

The flow chart in FIG. 6 can also be expressed in terms of instructions that are used by the license manager 25B to cause the above-described functions to be performed. Such instructions are set forth in Appendix B.

Release of License 27

When the user finishes use of the copy of the computer program 24A or 24B that was authorized by a license 27, that copy calls its respective license manager 25A or 25B.

If the license manager is number 25A in the license transfer embodiment, then it is at the local node 14. The license manager 25A modifies the license file 22A at the local node 14 by changing item 2 to not be "in use" (FIG. 2B).

If the license manager is number 25B in the license pool embodiment, it is at the second remote node 20 in the example. The copy of the computer program 24B calls the license manger 25B and requests a release of the license 27. Via item 4 in the license file 22B for the license pool 28 (FIG. 5B), the i.d. of the second node 20 is known, such that the appropriate license pool 28 is identified. Item 3 in license file 22B (FIG. 5B) is then incremented by one unit and the "in use" i.d. for the second remote node is deleted from item 4.

The license manager 25B then returns to the copy of the computer program 24B at the local node 14 which causes the execution of the copy to stop in a known manner, e.g. via an "EXIT" command.

SUMMARY

It may be understood that both embodiments of the present invention avoid the use of a file server on a single node 12 of the network 11. Notwithstanding that, the license files 22A or 22B must be valid, otherwise a license 27 will not be usable to authorize a copy of the computer programs 24A or 24B to be executed, and such copies may be executed on any node 12. Since license files 22A and 22B can be on any of the nodes 12, even when the link 13 or another node 12 is inoperative, access can still be made to the license file 22A or 22B on the local node 14 for an available license 27.

While the preferred embodiment has been described in order to illustrate the fundamental relationships of the present invention, it should be understood that numerous variations and modifications may be made to these embodiments without departing from the teachings and concepts of the present invention. Accordingly, it should be clearly understood that the form of the present invention described above and shown in the accompanying drawings is illustrative only and is not intended to limit the scope of the invention to less than that described in the following claims.

---

APPENDIX A
Instructions For License Manager Program 25A

---

IF (license exists on local node AND
   license is not in use AND
   license is valid AND
   license has not lapsed) THEN
   Mark the license in use
   Tell computer program it can run
ELSE
   WHILE (not all nodes in network have been searched AND
   a license has not been found) DO
     IF  (license exists on next remote node AND
         license is not in use AND
         expiration date has not lapsed AND
         license is valid on next remote node) THEN
         Save the license information in memory
         Create new license file on local node
         Delete old license file from second remote node
         IF (old license file deleted) THEN
         Mark license file information as being in use
         Encrypt UID of new license and license
            information
         Write encrypted UID and information into new
            license file
         Tell computer program it can run
     ELSE
         delete new license file
     END IF
   END IF
   END WHILE
   IF (license was not found) THEN
     Tell computer program that it cannot run
   END IF
END IF

---

APPENDIX B
Instructions For License Manager Program 25B

--- found = FALSE
IF  (license pool exists on local node AND
   license pool is valid AND
   a license is available in license pool) THEN
   found = TRUE
END IF
WHILE (found = FALSE AND
   not all nodes searched) DO
   IF (license pool is valid AND
     a license is available in license pool) THEN
     found = TRUE
   END IF
END WHILE
IF (found = TRUE) THEN
   Decrement number of available licenses in pool
   Write information related to Computer Program
     into license pool
   Set status to "authorized to run"
ELSE
   Set status to "not authorized to run"
END IF
RETURN (status)

---

What is claimed is:

1. A computer network comprising:
a plurality of license storage keys;

a plurality of computers each in association with one of said license storage keys;

means for transferring a license from one of said keys to another of said keys;

means for preventing a program from running on a computer if the key associated with that computer does not contain an available license for that program.

2. The computer network of claim 1 wherein communications between a license storage key and a computer are encrypted.

3. A license management system for limiting the number of copies of a given computer program that are permitted to run simultaneously on one or more nodes of a network in which said nodes are connected, said limiting being according to the number of licenses for said given computer program that are authorized for said network; said system comprising:

license file means on at least one of said nodes for storing at least one of said licenses;

program storage means for storing a copy of said given computer program on each of said nodes at which it is desired to run a copy of said given computer program; and license management means operatively linked to each said copy, said license management means being responsive to a request from said copy to which it is operatively linked for searching said nodes to locate one of said license file means that has a license that is available for authorizing use at a local one of said nodes at which said requesting copy is stored, said search first being made at said local node and if no such license file means having an available license is located at said local node, said search continuing in seriatim among said nodes other than said local node until one such license file means having an available license is located or until all said nodes have been searched without locating one such license file means having an available license;

said license management means being responsive to the search of all of said nodes without locating one such license file means having an available license for returning to said copy at said local node a message preventing said copy from being run at said local node in response to said request.

4. A license management system according to claim 3, further comprising:

means for assigning a unique identification to each of said license file means;

said license management means being effective upon location of any one of said license file means to compare the unique identification of said located license file means to the unique identification assigned to said located license file means by said assigning means to determine whether said located license file means is valid, said license management means being effective in response to a determination that said located license file means is valid for determining whether said license in said located license file means is being used, said license being not available to authorize use of said copy of said given computer program if either said unique identification of said located license file means is invalid or if said license is being used.

5. A license management system according to claim 4, wherein:

said license file means includes a license pool capable of storing up to the authorized number of licenses; and said license management means being effective, in response to determining that said located license file means is valid and that a license in said located license file means is available, for decrementing the number of available licenses in said located file means.

6. A license management system according to claim 5, wherein:

said license management means also writes data into said license pool to indicate the nodes at which a copy of said given computer program is being run under one of said licenses.

7. A license management system according to claim 4, wherein:

said license management means includes means for encrypting said unique identification assigned to said license file means and for decrypting said unique identifications prior to comparing said unique identifications.

8. A management system for controlling the operability of computer programs on any of a plurality of workstations coupled together in a network, wherein it is required that a license be available for one of said workstations in order to enable a copy of a given one of said computer programs to run on said one workstation and wherein the number of licenses for said given computer program that is authorized on said network is less than or equal to the number of copies of said given computer program that can run simultaneously on said network, said system comprising:

license file means for storing at least one of said licenses on at least a selected one of said workstations;

system means for assigning to said license file means and storing an identification (UID) that is unique to said license file means; and means responsive to a request to run a copy of said given computer program on said selected workstation for searching said selected workstation to locate said license file means at said selected workstation, said searching means being responsive to locating said license file means for comparing said UID of said license file means to the UID stored by said system means for said license file means and, if said compared UIDs are the same, and if said license in said located license file means is not in use, enabling said copy of said given computer program to run on said selected workstation.

9. A management system according to claim 8, wherein:

said license file means includes a license pool capable of storing up to the authorized number of license; and said license management means being effective, in response to determining that said located license file means is valid and that a license in said located license file means is available, for decrementing the number of available licenses in said located file means.

10. A management system according to claim 9, wherein:

said license management means also writes data into said license pool to indicate the nodes at which a copy of said given computer program is being run under one of said licenses.

11. A computer according to claim 13, that is programmed to perform the following additional function:

further modifying said license file so that it indicates said particular workstation at which said copy of said given computer program is being executed under authorization of said formerly available license.

12. A computer that is programmed to perform functions selected to control the operability of computer programs on any of a plurality of workstations coupled together in a network, wherein it is required that a license be available when a request is made to execute a copy of a given one of said computer programs on a particular one of said workstations, and wherein an aggregate number of said licenses authorized for said network is less than the number of copies of said given computer program that can be executed simultaneously on said workstations of said network, said selected functions comprising:

storing a license file on at least one of said workstations, said license file including at least one of said licenses, the aggregate number of said licenses that are stored being less than the number of copies of said given computer program that can be executed simultaneously on said workstations;

assigning to each said stored license file an identification (UID) that is different from the UID of all other ones of said license files;

in response to a request to execute a copy of said given computer program at a particular one of said workstations, searching said particular workstation to determine whether one of said license files is stored on said particular workstation;

in response to locating said license file on said particular workstation, comparing said UID of said located license file to a system record of the UID for said located license file;

in response to said compared UIDs being the same, determining whether one of said licenses in said located license file is available to authorize execution of a copy of said given computer program at said particular workstation; and enabling said computer program to be executed on said particular workstation if said license is available.

13. A computer according to claim 12, wherein a plurality of licenses are in said license file, and wherein said computer is programmed to perform the following additional function:

in response to determining that one of said licenses is so available, modifying said license file so that it indicates that one fewer license is available for authorizing execution of a copy of said given computer program.

14. A license management system for controlling the running, at nodes connected in a network, of copies of a given computer program, wherein a license is required for each copy of said given computer program that is to run simultaneously with other copies of said given computer program, and wherein the number of licenses authorized for said network and said given computer program is less than the number of copies of said given computer program that can run simultaneously on said network, wherein a directory is on a given node for indicating which licenses, if any, are on said given node, and wherein a request can be made to run a copy of said given computer program at a first node when no license is available at said first node but is available at a second node, said system comprising:

license file means provided at each said node for containing at least one of said licenses;

system means for assigning a unique identification to each of said license file means on said nodes and for storing a record of each of said unique identifications; and first management means operatively linked to a copy of said given computer program at said first node for receiving said request and searching said license file means at said second node to determine that said license file means is at said second node;

said first management means being effective in response to said determination that said license file means is at said second node for comparing said unique identification of said license file means at said second node to said record of said unique identification in said system means to determine that said license file means at said second node is valid, and then to determine that at least one license therein is not in use;

said first management means being effective upon making both of said last-mentioned determinations for returning a status to said copy of said given computer program at said first node indicating that said copy of said given computer program is authorized to run.

15. A license management system according to claim 14, wherein:

if said license is not available on said second node, said first management means searches said nodes in addition to said first and second nodes until an available one of said licenses is located or all of said nodes of said network have been searched without locating an available license; and in response to said search of all said nodes without locating an available license, said first management means returns a message to said copy of said given computer program at said first node to prevent said copy of said given computer program from running on said first node so that the number of copies of said given computer program running simultaneously on said network is limited to the number authorized.

16. A license management system according to claim 14, wherein:

each said license file means at said nodes contains more than one of said licenses;

said first management means searches said license file means at said second node only when said license file means at said first node is invalid or all said licenses at said first node are in use; and said first management means being effective to modify said license file means at said second node before returning said status so that said license file means at said second node indicates that one more license is in use.

17. A management system for controlling the operability of copies of a given computer program on any of a plurality of workstations coupled together in a network, wherein more than one copy of said given computer program can be permitted to run simultaneously on a given one of said workstations, and wherein it is required that a license be available for each copy of said given computer program that is to run, and wherein an aggregate number of licenses for said given computer program that are available for said network is less than an aggregate number of copies of said given computer program that can run simultaneously on the workstations of said network; said management system comprising:

license file means stored on a selected one of said workstations at which it is desired to operate more than one copy of said given computer program, said license file means including at least two of said licenses;

system means for assigning to said license file means and storing therefor a unique identification;

means responsive to a request to run at least two of said computer programs on said selected workstation for searching said selected workstation to locate said license file means; and means responsive to said searching means locating said license file means on said selected workstation for comparing said identification of said located stored license file means to the identification stored by said system means for said respective license file means, and if said respective compared identifications are the same and two of the licenses in said license file means are not in use, enabling both of said corresponding copies of said given computer program to run on said selected workstation.

18. A method of controlling the operability of copies of a computer program on any of a plurality of workstations coupled together in a network, wherein it is required that a license be available for each copy of said computer program that is to be executed, and wherein the number of licenses for said computer program that are authorized for said network is limited, said method comprising the steps of:

storing at least one of said licenses in a license file on at least a selected one of said workstations;

assigning to each stored license file an identification (UID) that is different from the UID of all other ones of said license files;

searching said selected workstation in response to a request for execution of a copy of said computer program at said selected workstation to determine whether one of said license files is on said selected workstation;

upon locating said license file on said selected workstation, comparing said UID of said located stored license file to a record of said assigned UID for said located license file; and if said compared UIDs are the same, and if said license in said license file is available, then enabling said copy of said computer program to be executed at said selected workstation.

19. A method of controlling the operability of copies of a computer program according to claim 18, wherein said storing step stores the total number of authorized licenses in said license file on said selected workstation, said method further comprises the step of:

each time a copy of said computer program is enabled to be executed, said license file is updated to decrease the number of available licenses therein.

20. A method of controlling the operability of copies of a computer program according to claim 19, wherein:

each time said license file is updated data is entered therein identifying the copy of said computer program that is authorized to be executed and the workstation on which it is authorized.

21. A method of managing licenses to limit the number (S) of copies of a given computer program that may be executed simultaneously on the nodes of a network to less than or equal to the number (L) of licenses that are authorized for said network and said given computer program, each of said nodes having a system memory, license memory means for storing up to L ones of said licenses and a directory for identifying said licenses stored in said license memory means, said method comprising the steps of:

loading a copy of said given computer program onto each of said nodes on which it is desired to execute a copy of said given computer program, each said copy of said given computer program being current with respect to time when its term of authorized use has not expired;

loading an aggregate of L licenses into said license memory means on said nodes of said network such that a maximum of L copies of said given computer program can be executed simultaneously on said network;

assigning to each said license memory means an identification that is unique to said license memory means at each said node at the time of such loading;

in response to a request for the execution of a copy of said given computer program at a first of said nodes, searching said directory at said first node for license memory means thereon, and upon determining that no license memory means is at said first node or that all licenses in said license memory means located at said first node are active or that the unique identification of said license memory means located at said first node is invalid, then sequentially searching said directories at other ones of said nodes for said license memory means; and upon locating license memory means that is at another node and that has a valid unique identification and that has an inactive, current license therein, returning a run message to said copy of said given program at said first node to enable said copy of said computer program to be executed on said first node.

22. A method according to claim 21, wherein said loading step loads said L licenses only onto said license memory means at said first node, and said method comprising the further step of:

upon determining that no available licenses for said copy of said given computer program are at any of said nodes, returning a status to said copy of said given computer program at said first node indicating that said copy is not authorized to be executed.

23. A license management system for limiting the number of copies of a given computer program that are permitted to run simultaneously on one or more nodes of a network in which said nodes are connected, said limiting being according to the number of licenses for said given computer program that are authorized for said network, said licenses being loaded onto one or more of said nodes; said system comprising:

means for storing a copy of said given computer program on each of said nodes at which it is desired to run a copy of said given computer program; and license management means operatively linked to each said copy, said license management means being responsive to a request from said copy to which it is operatively linked for searching said nodes to locate one of said licenses that is available for use at a local one of said nodes at which said requesting copy is stored, said search first being made at said local node and if no available license is located at said local node, said search continuing in seriatim among said nodes other than said local node until an available license is located or until all said nodes have been searched without locating an available license; said license management means being responsive to the search of all said nodes without locating an available license for returning to said copy at said local node a message preventing said copy from being run at said local node in response to said request.

24. A management system for controlling the operability of computer programs on any of a plurality of workstations coupled together in a network, wherein it is required that a license be available at one of said workstations in order to enable a copy of one of said computer programs to run on said one workstation and wherein the number of licenses for a given computer program that is authorized to run on said network is less than the number of copies of said given computer program that can run simultaneously on said network, said system comprising:

means for storing one of said licenses on at least a selected one of said workstations, the number of said workstations on which said licenses are stored being less than the number of copies of said given computer program that can run simultaneously on said workstations;

system means for assigning to each said stored license and storing an identification (UID) that is different from the UID of all other ones of said licenses;

means responsive to a request to run a copy of said given computer program on said selected workstation for searching said selected workstation to determine whether one of said licenses is available to authorize a copy of said given computer program to run on said selected workstation; and means responsive to locating said available license for comparing said UID of said located available stored license to the UID stored by said system means for said located available license and, if said compared UIDs are the same, enabling said copy of said computer program to run at said selected workstation.

25. A management system according to claim 24, further comprising:

said storing means also stores one of said licenses on one of said workstations other than said selected workstation;

means responsive to said searching means not locating an available one of said licenses at said selected workstation but locating of one of said licenses at said workstation other than said selected workstation for determining that said license at said other workstation is available at said other workstation, said determining means being effective to transfer said available license from said other workstation to said selected workstation; and means responsive to said transfer of said license to said selected workstation for causing said system means to assign a new and different UID to said license transferred to said selected workstation, said new and different UID assigned to said transferred license being different from the UID assigned thereto prior to said transfer of said transferred license to said selected workstation and being different from the UID of all other ones of said licenses.

26. A management system according to claim 25 wherein:

said comparing means is responsive to said assignment of said new and different UID to said license transferred to said selected workstation for comparing said new and different UID to the UID stored by said system means for said transferred license, said comparing means enabling said copy of said given computer program to be executed on said selected workstation in the event that said compared UIDs are the same.

27. A management system according to claim 24, wherein:

said comparing means also determines whether said available license at said selected workstation is current, and if current and if said compared UID's are the same, said comparing means enables said copy of said given computer program at said selected workstation to be executed.

28. A management system according to claim 24, wherein:

said storing means includes means for encrypting said UID; and said comparing means decrypts said UID before performing said comparison.

29. A management system according to claim 24, wherein:

said storing means also stores data indicating whether said license is valid and is being run.

30. A management system according to claim 25, further comprising:

means for encrypting said UID of said license transferred to said selected workstation; and means for erasing said transferred license from said other workstation so that said transferred license may run only at said selected workstation.

31. A management system according to claim 30, in which:

said transferred license is originally in a license file at said other workstation;

said determining means includes means for copying said license file onto said selected workstation; and said erasing means is effective in response to said operation of said copying means.

32. A computer that is programmed to perform functions selected to control the operability of computer programs on any of a plurality of workstations coupled together in a network, wherein it is required that a license be available at one of said workstations in order to enable a copy of a given one of said computer programs to run on said one workstation, and wherein the number of said licenses authorized for said network is less than the number of copies of said given computer program that can run simultaneously on said network, said selected functions comprising:

storing one of said licenses on at least a selected one of said workstations, the number of said workstations on which one of said licenses is stored being less than the number of copies of said given computer program than can run simultaneously on said workstations;

assigning to each said stored license an identification (UID) that is different from the UID of all other ones of said stored licenses;

in response to a request to run a copy of said given computer program at said selected workstation, searching said selected workstation to determine whether one of said licenses is stored and available on said selected workstation;

in response to locating said available license stored on said selected workstation, comparing said UID of said located stored license to a system record of the UID for said located stored license; and in response to said compared UIDs being the same, enabling said copy of said given computer program to run on said selected workstation.

33. The computer defined in claim 32, said selected functions further comprising:

in response to not locating one of said available licenses on said selected workstation, searching said workstations other than said selected workstation to determine whether one of said licenses is stored on said other workstation;

in response to locating one of said available licenses at said other workstation, determining that said license at said other workstation is current and valid;

transferring said available, current and valid license from said other workstation to said selected workstation; and in response to said transfer of said available, current and valid license to said selected workstation, causing a new and different UID to be assigned to said available, current and valid license transferred to said selected workstation.

34. The computer defined in claim 33, said selected functions further comprising:

storing said last-mentioned UID assigned to said transferred license;

deleting said UID that was assigned to said transferred license when said transferred license was stored at said other workstation; and enabling said copy of said given computer program to be run on said selected workstation once said deleting has occurred.

35. The computer defined in claim 32, wherein said selected functions further comprising:

encrypting said UIDs;

storing said encrypted UIDs; and decrypting said stored UIDs before performing said comparison.

36. The computer defined in claim 32, said selected functions further comprising:

in response to not locating an available license on said selected workstation, searching other of said workstations for an available license; and in response to not locating an available license on any of said other workstations, preventing said requested copy of said given computer program from being enabled to run on said selected workstation.

37. The computer defined in claim 32, wherein a directory is provided at a workstation other than said selected workstation and said storing function also stores at least one of said licenses on said other workstation; said selected functions further comprising:

updating said directory to record said storage of one of said licenses at said other workstation;

in response to said request and the determining that no license is available at said selected workstation, searching said directory to locate one of said licenses therein;

determining that said license located in said directory is available;

performing said comparing function to determine whether said available license in said directory is valid; and if said available license in said directory is valid, transferring said available valid license to said selected workstation.

38. A license management system for controlling the availability for operation, at nodes connected in a network, of copies of a given computer program on said nodes, wherein a license is required on each said node at which a copy of said given computer program is to run, and wherein the number of licenses authorized for said network and said given computer program is less than or equal to the number of copies of said given computer program that can run simultaneously on said network, wherein a license file is provided at each said node for indicating that one of said licenses is on said node, wherein a directory is on each of said nodes for indicating which licenses, if any, are on a given node, and wherein a request can be made to run a copy of said given computer program at a first node when no license is available at said first node but is available at a second node, said network including system means for assigning a unique identification to each license on said nodes, said system means being effective to store a record of said unique identifications; said system comprising:

first management means linked to said copy of said given computer program at said first node for receiving said request and searching said license file at said second node to determine whether or not said license is available on said second node;

said first management means being effective in response to said determination that said license is available on said second node for transferring said available license from said second node to said first node if said available license is valid at said second node and has not expired; and said first management means being effective for requesting said system means to assign a unique identification to said available license transferred to said first node.

39. A system according to claim 38, which further comprises:

said first management means including means for determining the validity of said unique identification of said license on said second node, said first management means comparing said unique identification of said license on said second node to the record of said unique identification stored in said system means for said license on said second node.

40. A system according to claim 39, wherein:

said determining means prevents said transfer operation of said first management means unless said validity has been confirmed and said compared unique identifications are found to be the same.

41. A system according to claim 38, said first management means further comprising the following to determine said validity:

means for encrypting and decrypting said unique identification assigned to said available license at said second node;

means responsive to said decrypted assigned unique identification for said available license at said second node for receiving from said system means said record of said unique identification corresponding to said license on said second node;

means for comparing said unique identification of said license at said second node to said record thereof from said system means; and means responsive to a match of said two last-mentioned unique identifications for rendering said available license at said second node transferable to said first node.

42. A system according to claim 38 in which a request can be made to execute a copy of said given computer program at said second node when said transferred license is still on said first node, said system further comprising:
    second management means linked to a copy of said given computer program at said second node for receiving said request for execution at said second node and searching said directory at said second node to determine that said license is not on said second node, said second management means searching said directory on said first node to determine that said license is on said first node;
    in response to said latter determination, said second management means transferring said license from said first node to said second node if said license is valid and not in use at said first node and has not expired; and
    upon completion of said transfer said second management means requesting said system means to assign a unique identification to said license transferred to said second node.

43. A management system for controlling the operability of copies of a given computer program on any of a plurality of workstations coupled together in a network, wherein more than one copy of said given computer program can be permitted to run simultaneously on a given one of said workstations, and wherein it is required that a license be available for each copy of said given computer program that is to run, and wherein the aggregate number of licenses for said given computer program that are available for said network is less than the aggregate number of copies of said given computer program that can run simultaneously on the workstations of said network; said management system comprising:
    means for storing at least two of said licenses on a selected one of said workstations at which it is desired to operate more than one copy of said given computer program;
    system means for assigning to each said stored license and storing therefor an identification that is different from the identification of all other ones of said licenses stored on said network;
    means responsive to a request to run at least two copies of said given computer program on said selected workstation for searching said selected workstation to determine whether one or more of said licenses is available on said selected workstation; and
    means responsive to said searching means locating at least one of said licenses on said selected workstation for comparing said identification of each said respective located stored license to the identification stored by said system means for said respective located stored license, and if said respective compared identifications are the same and the corresponding license is available on said selected workstation, enabling an amount of said copies of said given computer program equal to the number of available compared licenses located on said selected workstation to run on said selected workstation.

44. A license management system for limiting the number (S) of copies of a given computer program that may be executed simultaneously on the nodes of a network to less than or equal to the number (L) of licenses that are authorized on said network for said given computer program, each of said nodes having a system memory, license memory means for indicating characteristics of said licenses and a directory for identifying said licenses stored in said license memory means, said license management system comprising:
    means for loading a copy of said given computer program onto each of said nodes on which it is desired to execute said given computer program, each said copy of said given computer program being current with respect to time when its term of authorized use has not expired;
    means for loading L licenses into said license memory means on said nodes of said network such that no more than L copies of said given computer program can be executed simultaneously on said network, said loading means assigning to each said license an identification that is unique to said license at said node at the time of such assignment;
    license management means for identifying an inactive one of said licenses at a selected one of said nodes at which it is desired to execute a copy of said given computer program, said license being inactive when said copy of said given computer program at said one of said nodes is not being executed, said license management means including for each said node a separate license manager corresponding to said copy of said given computer program at said node such that at a first of said nodes there is a first license manager and a first copy of said given computer program and at a second of said nodes there is a second license manager and a second copy of said given computer program;
    said first copy of said given computer program being adapted to request from said first license manager the execution of said first copy of said given computer program at said first node;
    said first license manager being responsive to said request for searching said directory at said first node for one of said licenses, and upon determining that none of said licenses is inactive at said first node said first license manager searching said directories at said second node for a license;
    in response to locating an inactive current license at said second node, said license manager transferring said located inactive current license to said system memory at said first node, and upon said transfer said first license manager causing a unique identification to be assigned to said license transferred to said first node;
    means effective upon transfer of said transferred license to said system memory for erasing said transferred license from said license memory means at said second node;
    said first license manager writing said unique identification and said license into said license memory means at said first node; and
    said first license manager comparing said unique identification in said license memory means to said unique identification in said system memory and in the event of a match, said first license manager then returning a message for enabling said first copy of said given computer program to be executed on said first node.

45. A license management system according to claim 44, wherein:

in response to a request to execute a copy of said given computer program made when L copies of said given computer program are already being executed, each of said first and second license managers preventing the execution of any other copies of said given computer program until one of said L licenses becomes inactive.

46. A license management system according to claim 45, wherein:

said first license manager means encrypts said unique identification assigned to said transferred license and causes said encrypted unique identification to be stored in said license memory means at said first node.

47. A method of controlling the operability of copies of a computer program on any of a plurality of workstations coupled together in a network, wherein it is required that a license be available at each said workstation at which one or more copies of said computer program are to be executed, and wherein the number of licenses for said computer program that are authorized for said network is limited, said method comprising the steps of:

storing one of said licenses on at least a selected one of said workstations;

assigning to each said stored license an identification (UID) that is different from the UID of all other ones of said licenses;

searching said selected workstation in response to a request for execution of a copy of said computer program at said selected workstation to determine whether one of said stored licenses is available for use at said selected workstation;

upon locating said available stored license at said selected workstation, comparing said UID of said located available stored license to a record of said assigned UID for said located, available and stored license; and if said compared UIDs are the same, enabling said copy of said computer program to be executed at said selected workstation.

48. The method according to claim 47, wherein said storing step also stores at least one of said licenses on an other one of said workstations, further comprising the steps of:

upon failing to locate an available license at said selected workstation, continuing said search at said another workstation of said network;

upon locating one of said licenses at one of said workstations other than said selected workstation, determining that said license on said other workstation is available for use at said other workstation and then performing said comparing step;

transferring said available license from said other workstation to said selected workstation; and upon transferring said available license to said selected workstation, causing a new and different UID to be assigned to said license at said selected workstation.

49. A method according to claim 48, wherein said comparing step is performed upon said assignment of said new and different UID to said license transferred to said selected workstation, said comparing being of said new and different UID to the record of said new and different UID for said transferred license, further comprising the steps of:

enabling said copy of said computer program to be executed at said selected workstation in the event that said last-mentioned compared UIDs are the same.

50. The method according to claim 47, further comprising the steps of:

encrypting said UID assigned to a stored license; and decrypting said UID before performing said comparison step.

51. The method according to claim 47, further comprising the steps of:

storing data with said located license to indicate whether or not said located license is valid and is in use; and said comparing step is performed in response to said data indicating that said located license is available for use at said selected workstation.

52. A method of managing licenses to limit the number (S) of copies of a given computer program that may be executed simultaneously on the nodes of a network to less than or equal to the number (L) of licenses that are authorized for said network and said given computer program, each of said nodes having a system memory, license memory means for indicating characteristics of said licenses and a directory for identifying said licenses stored in said license memory means, said method comprising the steps of:

loading a copy of said given computer program into said license memory means on each of said nodes on which it is desired to execute a copy of said given computer program, each said copy of said given computer program being current with respect to time when its term of authorized execution has not expired;

loading L licenses into said license memory means on said nodes of said network such that a maximum of L copies of said given computer program can be executed simultaneously on said network;

assigning to each said loaded license an identification that is unique to said license at a particular one of said nodes at the time of such loading;

identifying an inactive one of said licenses at a selected one of said nodes at which it is desired to execute a copy of said given computer program, said license being inactive when said copy of said given computer program at said selected one of said nodes is not being executed;

in response to a request for the execution of a copy of said given computer program at a first of said nodes, searching said directory at said first node for a license, and upon determining that no license is at said first node or that all licenses are active at said first node, sequentially searching said directories at ones of said nodes other than at said first node for an inactive, current license;

transferring to said first node an inactive current license located at another one of said nodes;

assigning a unique identification to said license transferred to said first node;

erasing the unique identification of said transferred license from said other node; and returning a run message to enable said copy of said given computer program to be executed on said first node.

53. The method according to claim 52, further comprising the step of:

encrypting said UID of said license transferred to said first node;

said erasing from said other node of the UID of said transferred license being performed so that said transferred license may be executed only at said first node.

54. The license management method according to claim 52, further comprising the steps of:
encrypting the unique identification assigned to each said license; and
decrypting the unique identification of said license at another one of said nodes so that said license can be identified as a current, inactive license prior to transfer thereof to said first node.

55. A license management system for limiting the number of copies of a given computer program that are permitted to run simultaneously on one or more nodes of a network in which said nodes are connected, said limiting being according to the number of licenses for said given computer program that are authorized for said network; said system comprising:
license file means on at least one of said nodes for storing at least one and up to a selectable authorized number of said licenses;
program storage means for storing a copy of said given computer program on at least one of said nodes without limiting the running of said given computer program to running on said one node; and
license management means responsive to a request to run, said request being from one of said copies at a particular one of said nodes, for searching as many of said nodes as are necessary to locate one of said license file means that has a license that is available for authorizing a copy of said given computer program to run at said particular one of said nodes;
said license management means being responsive to said search not locating any of said license file means having an available license for returning to said requesting copy a message preventing said copy from running in response to said request.

56. A license management system according to claim 55, wherein:
said license file means includes a license pool capable of storing up to the authorized number of licenses; and
said license management means, in response to locating one of said license file means having a license that is available, decrements the number of available licenses in said located file means.

57. A license management system according to claim 56, wherein:
said license management means also writes data into said located license file means to indicate the node at which said copy of said given computer program is being run under said license.

58. A license management system according to claim 55, further comprising:
means for assigning a unique identification to each of said license file means;
said license management means being effective upon location of any one of said license file means to compare the unique identification of said located license file means to the unique identification assigned to said located license file means by said assigning means to determine whether said license file means is valid, said license management means being effective in response to a determination that said located license file means is valid for determining whether any of said licenses in said located license file is available for authorizing a copy of said given program to run, said licenses being not available to authorize running of said copy of said given computer program if either said unique identification of said license file means is invalid or if all of said licenses are being used.

59. A license management system according to claim 55, further comprising:
said license file means includes a license file on each of at least two of said nodes, said license files including a license pool for storing said licenses, the aggregate number of licenses stored in all of said license pools equalling said selectable authorized number of said licenses, the number of said licenses in said pools that are available being variable according to the number of licenses in current usage; and
said license management means, in response to locating one of said license pools having an available license, reduces the number of available licenses in said located license pool.

60. A management system for controlling the operability of computer programs accessed from any of a plurality of nodes coupled together in a network, wherein it is required that a license be available in order to enable said node to operate using a copy of a given one of said computer programs and wherein the number of licenses for said given computer program that is authorized to operate on said network is limited so that the number of copies of said given computer program that can operate simultaneously on said network is limited, said system comprising:
license file means for storing at least one of said licenses on at least one of said nodes;
system means for assigning to said license file means and storing an identification (UID) that is unique to said license file means; and
means responsive to a request from any of said nodes for operation of a copy of said given computer program for searching to locate said license file means at any of said nodes, said searching means being responsive to locating said license file means at said one node for comparing said UID of said license file means to the UID stored by said system means for said license file means and, if said compared UIDs are the same, and if a license in said located license file means is not in use, enabling said selected node to operate using said copy of said given computer program.

61. A management system according to claim 60, wherein:
said license file means includes a license pool capable of storing up to the authorized number of licenses; and
said license management means being effective, in response to determining that said located license file means is valid and that a license in said located license file means is available, for decrementing the number of available licenses in said located file means.

62. A management system according to claim 60, wherein:
said license management means also writes data into said license pool to indicate the one of said nodes at which a copy of said given computer program is being used under one of said licenses.

63. A license management system for controlling the availability for use of copies of a given computer program, said copies being used in response to requests for use from nodes connected in a network, wherein a license is required for each copy of said given computer program that is to be used simultaneously with other copies of said given computer program, and wherein the number of licenses authorized for said network and said given computer program is limited, wherein a directory is on each of said nodes for indicating which licenses are on particular ones of said nodes, and wherein said requests can be made to use a copy of said given computer program when no license is available at the node that requests such use but is available at a second node, said system comprising:

- at least one license file means for containing at least one of said licenses;
- system means for assigning a unique identification to each of said license file means and for storing a record of each of said unique identifications; and
- first management means for receiving said request and searching to determine that said license file means is at said second node;
- said first management means being effective in response to said determination for comparing said UID of said license file means at said second node to said record of said UID in said system means to determine that said license file means at said second node is valid, and then to determine that at least one license therein is available for use;
- said first management means being effective upon making all of said determinations for returning a status to said node indicating that said copy of said given computer program is authorized to be used.

64. A license management system according to claim 63, wherein:

- each said license file means contains more than one of said licenses;
- said first management means searches said license file means at said second node only when a license file means at said requesting node is invalid or all said licenses at said first node are in use; and
- said first management means being effective to modify said license file means at said second node before returning said status so that one more license is recorded in said license file means as being in use at said second node.

* * * * *